(12) United States Patent
Glitho et al.

(10) Patent No.: US 6,614,784 B1
(45) Date of Patent: Sep. 2, 2003

(54) SYSTEM AND METHOD FOR PROVIDING SUPPLEMENTARY SERVICES (SS) IN AN INTEGRATED TELECOMMUNICATIONS NETWORK

(75) Inventors: Roch Glitho, Montreal (CA); Christophe Gourraud, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/458,801

(22) Filed: Dec. 10, 1999

Related U.S. Application Data

(60) Provisional application No. 60/116,198, filed on Jan. 15, 1999.

(51) Int. Cl.$^7$ ............................................... H04L 12/66
(52) U.S. Cl. ........................................ 370/352; 370/356
(58) Field of Search ................................ 370/352–356, 370/338

(56) References Cited

U.S. PATENT DOCUMENTS

| | | | | |
|---|---|---|---|---|
| 6,185,288 B1 | * | 2/2001 | Wong | 379/219 |
| 6,243,443 B1 | * | 6/2001 | Low et al. | 379/88.17 |
| 6,246,758 B1 | * | 6/2001 | Low et al. | 379/230 |
| 6,272,127 B1 | * | 8/2001 | Golden et al. | 370/352 |
| 6,282,281 B1 | * | 8/2001 | Low | 379/230 |
| 6,470,010 B1 | * | 10/2002 | Szviatovszki et al. | 370/356 |

FOREIGN PATENT DOCUMENTS

| | | | |
|---|---|---|---|
| EP | 0833488 A1 | 4/1998 | |
| WO | WO 96/38018 | 11/1996 | |
| WO | WO 97/22209 | 6/1997 | |
| WO | WO 98/28885 | 7/1998 | |
| WO | WO 99/00953 | 1/1999 | |

* cited by examiner

Primary Examiner—Ajit Patel
Assistant Examiner—Chirag Shah
(74) Attorney, Agent, or Firm—Smith & Danamraj, PC (57) ABSTRACT

A system and method of service provisioning in an integrated telecommunications network having a packet-switched network portion (PSN) and a circuit-switched network (CSN) portion with a gateway disposed therebetween. A service node comprising a Service Control Point (SCP), a Service Data Point (SDP), or both, is provided with an interface operable with the PSN portion. A first entity (e.g., served entity) is capable of accessing the service node for the purpose of invoking a service. A return result from the service node is provided, based on the decision of what action is to be taken with respect to the service request, to the first entity which then determines how the action is to be effectuated. An indication is thereafter provided by the first entity to a second entity (e.g., re-routing entity) preferably using H.450.X messages. In response, the second entity (i.e., re-routing or switching entity) takes an appropriate service action based on the return result obtained from the service node. In a presently preferred exemplary embodiment, legacy service nodes built on the basis of WIN/IN service architecture are utilized for the provisioning of Value-Added Services (VAS) or Supplementary Services (SS) in VoIP networks operable with the H.450.X Recommendations.

14 Claims, 6 Drawing Sheets

SYSTEM AND METHOD FOR PROVIDING SUPPLEMENTARY SERVICES (SS) IN AN INTEGRATED TELECOMMUNICATIONS NETWORK

PRIORITY STATEMENT UNDER 35 U.S.C §119 (e) & 37 C.F.R. §1.78

This nonprovisional application claims priority based upon the following prior U.S. provisional patent application entitled: "Enhancing Supplementary Services through the Use of Intelligent Network Principles and Accessing Service Nodes from End Terminals," Ser. No. 60/116,198 filed Jan. 15, 1999, in the names of: Roch Glitho and Christophe Gourraud.

CROSS-REFERENCE TO RELATED APPLICATIONS

This application discloses subject matter related to the subject matter disclosed in the following co-assigned patent application: "System and Method for Providing Access to Service Nodes from Entities Disposed in an Integrated Telecommunications Network," filed Dec. 27, 1999, Ser. No. 09/472,410, in the names of: Roch Glitho and Christophe Gourraud.

BACKGROUND OF THE INVENTION

1. Technical Field of the Invention

The present invention relates to integrated telecommunication systems and, more particularly, to a system and method for provisioning Supplementary Services (SS) in an integrated telecommunications network. The integrated telecommunications network may comprise a packet-switched network (PSN) portion that is coupled to a circuit-switched network (CSN). For example, a network using the Internet Protocol (IP) may comprise the PSN portion. Also, for example, a Public Switched Telephone Network (PSTN) or a Public Land Mobile Network (PLMN) may comprise a CSN portion. Furthermore, the teachings of the present invention are applicable to pure PSNs also.

2. Description of Related Art

Coupled with the phenomenal growth in popularity of the Internet, there has been a tremendous interest in using packet-switched network infrastructures (e.g., those based on IP addressing) as a replacement for, or as an adjunct to, the existing circuit-switched network infrastructures used in today's telephony. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Some of the market drivers that impel the existing Voice-over-IP (VoIP) technology are: improvements in the quality of IP telephony; the Internet phenomenon; emergence of standards; cost-effective price-points for advanced services via media-rich call management, et cetera. One of the emerging standards in this area is the well-known H.323 protocol, developed by the International Telecommunications Union (ITU) for multimedia communications over packet-based networks. Using the H.323 standard, devices such as personal computers can inter-operate seamlessly in a vast inter-network, sharing a mixture of audio, video, and data across all forms of packet-based networks which interface with circuit-switched network portions.

The H.323 standard defines four major types of components for forming an inter-operable network: terminals, gateways, gatekeepers and Multipoint Control Units (MCUs). In general, terminals, gateways and MCUs of an H.323-based network are referred to as "endpoints." Gateways are typically provided between networks (or network portions) that operate based on different standards or protocols. For example, one or more gateways may be provided between a packet-switched network (PSN) portion and a circuit-switched network (CSN) portion. Terminals are employed by end-users for accessing the network or portions thereof, for example, for placing or receiving a call, or for accessing multimedia content at a remote site.

The gatekeeper is typically defined as the entity on the network that provides address translation and controls access to the network for other H.323 components. Usually, a gatekeeper is provided with the address translation capability for a specified portion of the network called a "zone." Accordingly, a plurality of gatekeepers may be provided for carrying out address translation that is necessary for the entire network, each gatekeeper being responsible for a particular zone. In addition, gatekeepers may also provide other services to the terminals, gateways, and MCUs such as bandwidth management and gateway location.

As is well-known in the telecommunications industry, services and service provisioning are the raison d'être of a telecommunications network, including VoIP networks. Services are typically categorized into (i) "basic services" (i.e., services which allow basic call processes such as call establishment and termination) or (ii) "advanced services" which are also commonly referred to as Value-Added Services (VAS). Examples of advanced services include split charging, 800-services, credit card calls, call forwarding, etc. It is also well-known that advanced services operate as factors for market differentiation and are crucial for network operators' (or service providers') success.

Value-Added Services in H.323-based VoIP networks are known as Supplementary Services (SS) and the provisioning thereof is based on the principles set forth in the ITU's H.450.X Recommendations. A Supplementary Service Control (SS-C) entity functions as the cornerstone of the service architecture. The generic architecture is described in Recommendation H.450.1 while architectures for specific services are described in separate Recommendations, for example, H.450.2 Recommendation for call transfer and H.450.3 Recommendation for call diversion. Similarly, H.450.4 through H.450.7 Recommendation Series are underway for call hold, call park-call pickup, call waiting, and message indication, respectively.

While service provisioning schemes based on the H.450/H.323 service architecture offer certain strengths (e.g., flexibility in role mapping for realizing services with end-to-end connectivity and having intelligence distributed to the "edges" of the network), there exist several disadvantages and drawbacks. It should be appreciated that these inadequacies arise from the requirement that service provisioning be based primarily on interactions among SS-C entities provided within the H.323 entities of the network. Also, in general, the SS-C entities are defined on a service-by-service basis only. In other words, every VAS (i.e., SS) has its own set of control entities and control messages, wherein signaling for the realization of the services is based on H.450.X messages encapsulated in H.225.0 signaling.

The generic architecture of the SS-C entities, which exchange messages for the support of Supplementary Services, only partly addresses service utilization. Further, it does not address service creation at all. More significantly, the H.450.X-based service architecture does not provide for universal access that is independent of location and mobility of subscribers. Moreover, no provision exists for interoperability with the existing service logic base that is market-tested and already satisfies most of the desirable architectural requirements set forth hereinbelow.

Although there have been considerable advances in the H.450.X-based service architecture technology, it should be appreciated by those of ordinary skill in the art that these advances do not adequately address the shortcomings and weaknesses that still exist in the state-of-the-art service provisioning schemes in H.323-based VoIP networks as set forth above. For example, some of the critical phases of a service life cycle such as service creation, deployment and withdrawal are not addressed by the H.450.X-based service architecture. Also, more importantly from the network operators' perspective, no provision is made for independent service logic development and user profile management.

Another critical shortcoming is that because of the "service-by-service" approach of the H.450 service architecture, a rather "skimpy" generic specification is provided with a fairly thick specification for each particular service or a variant thereof. It should be appreciated that because the standardization process for each new service is typically quite lengthy, service providers' need for quick service creation and rapid deployment, key elements in-market penetration, is not met by such a bifurcated approach to service architecture.

Based on the foregoing, it is apparent that there has arisen an acute need for a service provisioning solution for use within the context of the burgeoning VoIP technology which overcomes these and other shortcomings and deficiencies of the current H.450.X-based service provisioning architecture. The present invention provides such a solution.

SUMMARY OF THE INVENTION

In one aspect, the present invention is directed to a service provisioning method for use in an integrated telecommunications network which includes a packet-switched network (PSN) portion (as a Voice-over-Internet Protocol (VoIP) network) and a circuit-switched network (CSN) portion such as a cellular network portion (e.g., PLMN). A service node including a Service Control Point (SCP), a Service Data Point (SDP), or both, is disposed in the cellular network portion. An interface module is provided between the service node and the PSN portion so that the service node can be accessed from an entity disposed in the PSN portion. When a service is invoked in a first entity disposed in the PSN portion, a service message is sent from the first entity to the service node via the interface module. Thereafter, a service logic portion associated with the service is executed by the service node on the basis of the service message to determine what action is to be taken with respect to the invoked service. A return result which corresponds to the action thus determined is subsequently transmitted from the service node to the first entity. The first entity determines how the action is to be effectuated and the return result or its indication is thereafter passed from the first entity to an appropriate second entity (e.g., switching or re-routing entity) using a message that is compatible with the messaging standard/protocol utilized by the PSN portion. In response, the second entity (i.e., re-routing entity) takes an appropriate service action based on the indication received from the first entity.

In another aspect, the present invention is directed to an integrated telecommunications network which comprises a PSN portion with a gatekeeper and a plurality of terminals.

A CSN portion is coupled to the PSN via a suitable gateway. Also, a service node having an IP-interface is coupled to the PSN portion such that an entity disposed in the PSN portion can access service logic provided at the service node. Preferably, the service node includes an SCP, SDP, or both. The service node operates to execute a service logic portion responsive to a service request by an IP entity, thereby determining what action is to be taken corresponding to the service request. A decision-implementation logic block is provided within the IP entity for determining how the action is to be effectuated for the requested service based on a return result obtained from the service node.

In yet another aspect, the present invention provides a call diversion method for use in an integrated telecommunications network that includes a PSN portion and a CSN portion. Also, a service node including an SCP, SDP, or both, is coupled via an interface to the PSN portion. Preferably, the PSN portion includes a call-originating entity, a served entity and a switching entity. The call diversion method commences by sending a first setup message from the call-originating entity to the switching entity pursuant to placing a call to the served entity. Thereafter, a second setup message is sent from the switching entity to the served entity and a first connection therebetween is accordingly established. Responsive thereto, a service message is sent from the served entity to the service node via the interface. The service node executes a service logic portion associated with the service, based on the service message. Thereafter a return result is sent from the service node to the served entity, wherein the return result comprises an address of a diverted-to entity to which the call from the call-originating entity is to be diverted. A call re-routing request is then transmitted from the served entity to the switching entity. Preferably, the call re-routing request includes an indication of the return result from the service node. Responsive thereto, a call re-routing request answer is sent from the switching entity to the served entity. Subsequently, the first connection between the switching entity and the served entity is released. After granting admission to the diverted-to entity by the switching entity, a second connection between the call-originating entity and the diverted-to entity is established.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF EMBODIMENTS

Figure 1:
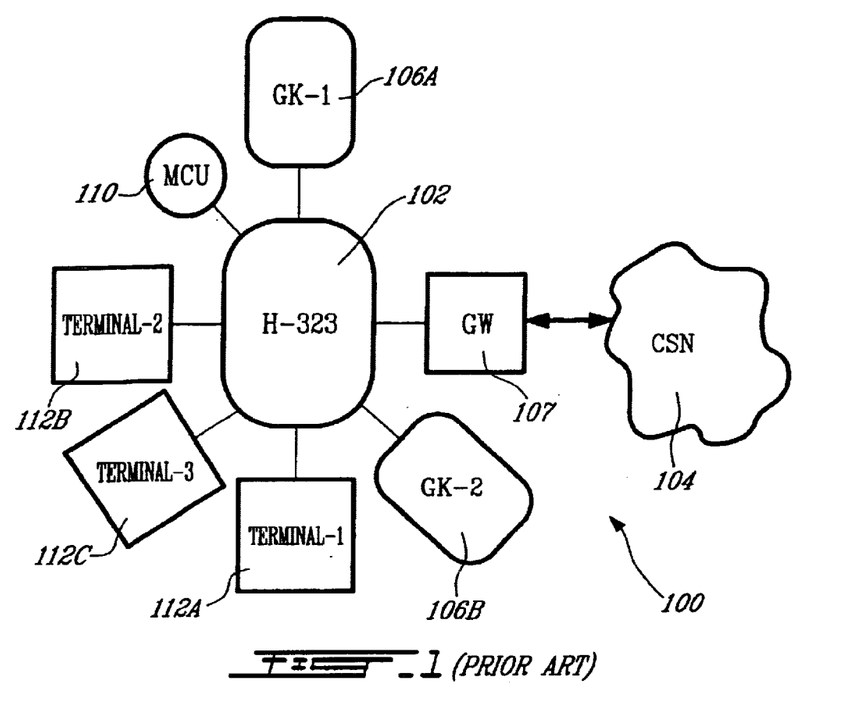
FIG. 1 (Prior Art) depicts a conventional network with a H.323 portion coupled to a CSN.

In the drawings, like or similar elements are designated with identical reference numerals throughout the several views, and the various elements depicted are not necessarily drawn to scale. Referring now to FIG. 1, depicted therein is a conventional network 100 including an H.323-based network portion 102 that is coupled to a CSN 104 (e.g., a Public Switched Telephone Network or PSTN) via a gateway (GW) 107. A plurality of H.323 terminals, e.g., terminal-1 112A through terminal-3 112C, one or more gatekeepers (GKs), e.g., GK-1 106A and GK-2 106B, and an MCU 110 are disposed in the H.323 network portion 102 in a conventional manner.

Figure 2:
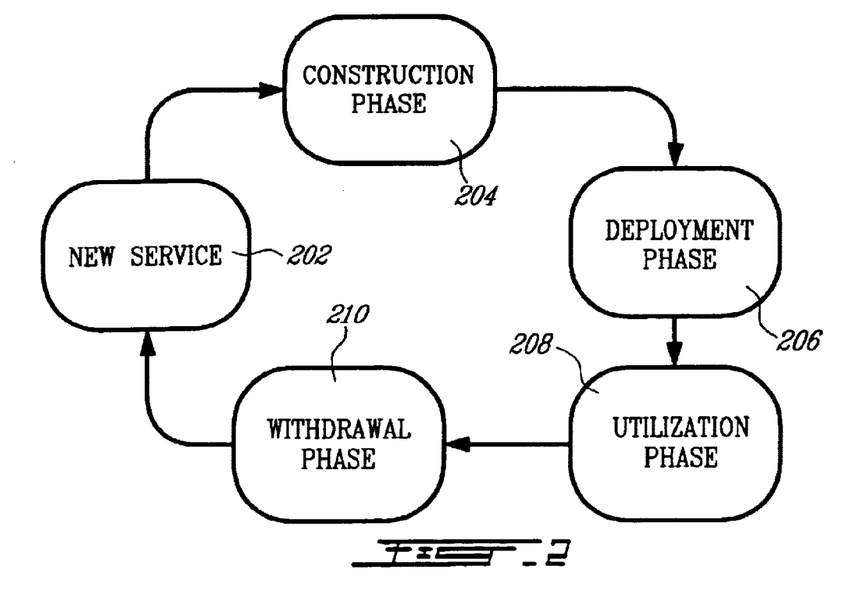
FIG. 2 depicts a typical service life cycle for service provisioning in a telecommunications network.

Referring now to FIG. 2, a typical life cycle for the provisioning of advanced services in a telecommunications network is shown therein. As can be readily appreciated by one of ordinary skill in the art, the concept of a service life cycle permits the refinement of the activities related to service creation and management within the context of the network's infrastructure. The service life cycle concept is useful for the purposes of the present patent application: First, it provides a backdrop for setting forth a set of architectural requirements for the provisioning of advanced services. Second, the service life cycle concept may be advantageously used in highlighting the deficiencies and shortcomings of the existing solutions for service provisioning in an H.323-based network.

Analogous to the life cycle phases set forth by the Telecommunication Information Network Architecture Consortium (TINA-C), four phases may typically be defined within a service life cycle relating to a new service 202: (i) service construction 204, (ii) deployment 206, (iii) utilization 208, and (iv) withdrawal 210. The service construction phase 204 allows a refinement of the activities related to what is traditionally referred to as service creation in telecommunications. It includes specifying service requirements, service logic design and service logic testing. For the sake of precision, it is useful in the context of the present patent application to separate service logic into two distinct parts: a decision-making part and a decision-implementation part. The decision-making part refers to the logic which determines what actions are to be carried out by the network after invoking a service. On the other hand, the decision implementation part comprises the logic for determining how the network entities collaborate to carry out the actions.

A specific service, for example, the Conditional Call Forward (CCF) service, may be used for illustration. When the CCF service is invoked, the decision-making part checks the criteria for forwarding the call and if they are met, it determines the number or numbers to which the call is to be forwarded. Criteria can be simple (e.g., a Line Busy signal) or complex (e.g., previous number of calls received from the caller during normal working hours in a pre-set time period). The decision-implementation part (i.e., IP-telephony-specific part) determines how the actual re-routing is to be done. As will be described in greater detail hereinbelow, in H.323-based networks, a dedicated set of messages is used for executing decision-implementation service (re-routing) logic.

The service deployment phase 206 encompasses service planning, installation and activation. Services are typically activated at network level so that they are ready for use in the network. However, users need to subscribe to the services in order to use them in the utilization phase 208. The service withdrawal phase 210 encompasses de-activation at network level and removal from the network.

Services may be activated for specific users, provided they have been activated at network level and the users have subscribed. They can also be de-activated for specific users. Service activation and de-activation at user level are usually part of the service utilization phase 208 which further includes service execution.

Service deployment, utilization (except service execution) and service withdrawal define the activities related to what is traditionally known in the telecommunications industry as service management. It should be readily appreciated that service life cycles are closely linked to subscriber life cycles which, in turn, are related to subscriber service profiles. A subscriber service profile describes a particular service and its customization for a specific subscriber.

Based on the foregoing, the following architectural requirements for service provisioning may now be introduced. First, a service architecture should support all service life cycle phases, although the level of support may be different. It should not be tied to specific services or groups of services. That is, the architecture should support as many services as possible.

Further, the service architecture should be open and inter-operable with respect to the entities involved in a telephony environment. For example, the architecture needs to provide a common platform for equipment suppliers, network operators, service providers and end users. It should also allow rapid service creation and deployment in order to be successful in the marketplace.

In addition, the architecture should provide for customization of services in order to satisfy the requirements of different customers or groups of customers. Moreover, services should not be tied to any particular kind of network technology. That is, the service architecture should be such that it allows independent evolution of services and network infrastructures. Furthermore, end users should be able to access services regardless of location and terminals. Finally, the service architecture should interwork with other value-added service architectures. That is, the service architecture designed for the Internet telephony environment should preferably interwork with legacy circuit-switched telephony environments as well. It should be readily appreciated that the current H.450/H.323-based service architecture does not address many, if not most, of the architectural requirements set forth above.

VAS signaling in the context of a specific service application is provided below for the purpose of concretizing the H.450-based service provisioning principles.

As is well-known, the H.323/H.450 framework supports several "flavors" of call diversion (SS-DIV). The H.450.3 Recommendation describes some of these flavors in more detail. For the sake of completeness and brevity, only salient features are set forth herein. In the first flavor, calls to a given subscriber are always diverted, provided that the service is active (that is, the service is activated at network level and activated for the specific user). In the second, calls are diverted if the line is busy; and in the third, they are diverted if there is no reply after a given time. The first flavor is termed Supplementary Service Call Forward Unconditional (SS-CFU), the second flavor is termed Supplementary Service Call Forward Busy (SS-CFB), and the third and last flavor is termed Supplementary Service Call Forward No Reply (SS-CFNR).

Typically, call diverting SS-C entities are the activating, deactivating, diverting (or served), interrogating, last diverting, original diverting (or served), and the re-routing endpoints. It should be appreciated that most of these terms are self-explanatory. The diverting or served endpoint is the endpoint where diversion is invoked. Last diverting and original diverting endpoints are applicable to calls with successive diversions. The last diverting point is the diverting endpoint at any specific stage of a call with successive diversions. The original diverting endpoint is the diverting endpoint at the first diversion. The re-routing entity is the entity which establishes the call to the endpoint to which the call is re-routed. Interrogating endpoints receive from served endpoints information including the activating status of the service and if activated, the number to which calls are diverted.

Figure 3:
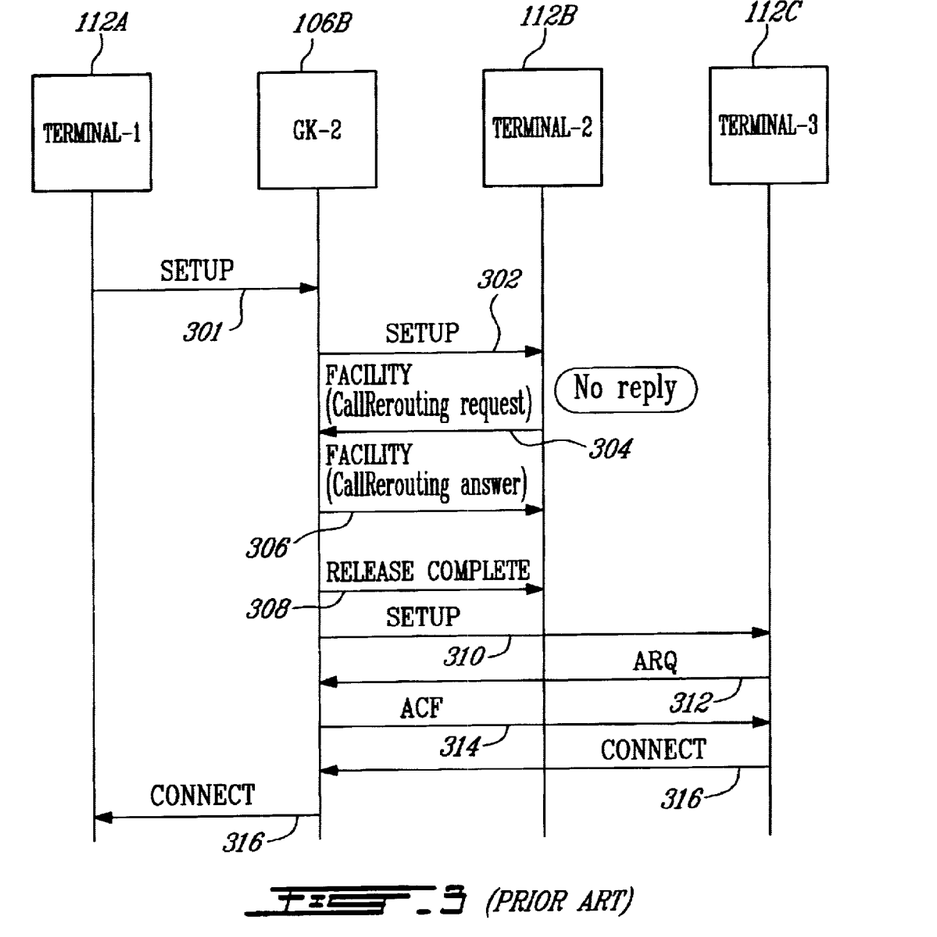
FIG. 3 (Prior Art) depicts a simplified message flow diagram for effectuating an exemplary service in a conventional H.323-based network.

FIG. 3 depicts a simplified message flow diagram for effectuating a specific call diversion service in a conventional H.323 network. For the purposes of illustration, it is assumed that gatekeeper-routed call signaling is used and the SS-CFNR is activated for the user using terminal-2 112B. It is further assumed that terminal-2 111B is the diverting endpoint and terminal-3 112C is the endpoint to which the call is diverted. The gatekeeper GK-2 106B is provided to be the re-routing entity. The call originating party is provided to be the user of terminal-1 112A.

Responsive to a Setup message 301 from terminal-1 112A, GK-2 106B forwards a Setup message 302 to the called party, i.e., terminal-2 112B, thereby establishing a connection therebetween. Thereafter, terminal-2 112B detects that SS-CFNR is to be invoked because there is no reply. The service logic checks whether the No Reply condition is valid and if so, determines that the call is to be diverted to terminal-3 112C. The decision-implementation service logic part then takes control of the call and queries the re-routing entity (i.e., GK-2 106B) to re-route the call to terminal-3 112C. A Call Re-routing Request by way of a Facility message 304 is sent from terminal-2 112B to GK-2 106B for this purpose. A Call Re-routing Answer by way of a facility reply message 306 is provided by the gatekeeper to terminal-2 112B as its acknowledgment. Thereafter, GK-2 106B releases the connection to terminal-2 112B by way of a Release Complete message 308 provided thereto.

In order to effectuate the re-routed connection to terminal-3 112C, GK-2 106B transmits a suitable Setup message 310 thereto. In response, terminal-3 112C sends an Admission Request (ARQ) message 312 to GK-2 106B. Pursuant to the granting of admission, an Admission Confirm (ACF) message 314 is transmitted from GK-2 106B to terminal-3 112C. After gaining admission, terminal-3 112C subsequently sends a Connect message 316 is sent to the gatekeeper which forwards it to terminal-1 112A.

Figure 4:
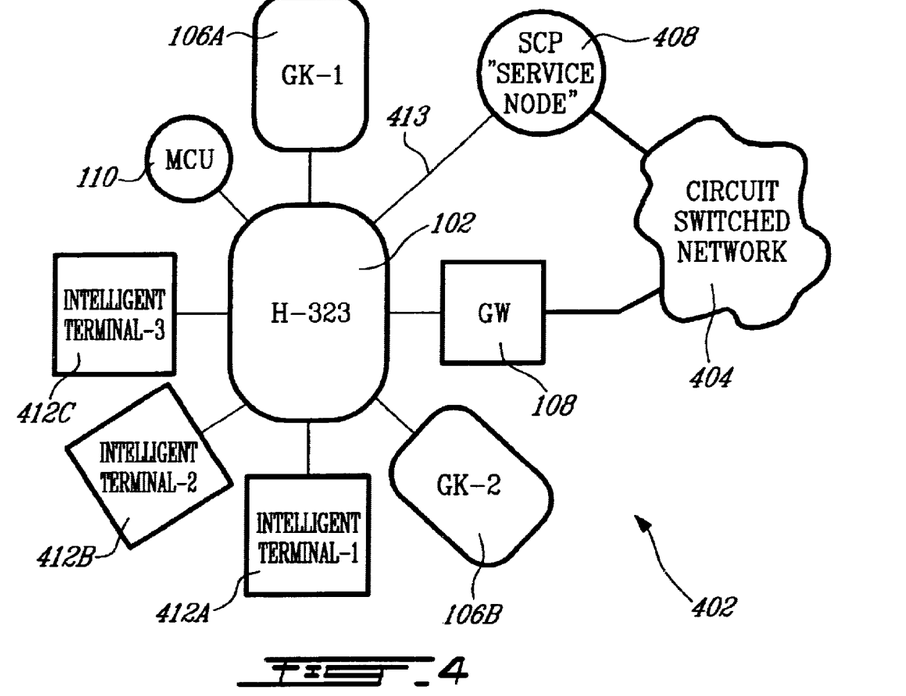
FIG. 4 depicts an integrated telecommunications network having a PSN-VoIP portion and a CSN portion wherein the teachings of the present invention are advantageously utilized.

Referring now to FIG. 4, shown there is a functional block diagram of an integrated telecommunications network 402 having a Voice-over-IP (VoIP) portion (e.g., H.323 portion 102) and a circuit-switched network portion 404 (e.g, a cellular network portion or PSTN), wherein the teachings of the present invention are advantageously utilized. It should be apparent that the H.323-based network portion 102 of the telecommunications network 402 essentially the same as the H.323 network portion described hereinabove with reference to FIG. 1, except as set forth below.

In the integrated telecommunications network 402, the infrastructure of the circuit-switched network portion 404 also includes in one exemplary embodiment legacy cellular network elements such as, for example, Home and Visitor Location Registers (HLR and VLR), one or more Authentication Centers (ACs), additional Mobile Switching Centers (MSCs) and/or Radio Network Controllers/base stations, et cetera, although not shown in this FIG.

One or more service nodes including at least a Service Control Point (SCP), for example, SCP service node 408, optimized for providing advanced services in the framework of Intelligent Network or Wireless Intelligent Network (IN/WIN) architecture, is associated with the network portion 404. The service node 408 is connected to the H.323 core 102 via a path 413 which may include an appropriate protocol converter/interface and is preferably operable with Signaling System No. 7 (SS7) or IP. The interface (I/F), which may be co-located with the node 408, is provided between the H.323 network portion 102 and the SCP service node 408 such that an H.323 entity, e.g., a gatekeeper or an endpoint can interrogate the service node 408 for instantiating a subscriber service. Additionally, the service node 408 may also be accessed via GW 108 in some implementations.

A plurality of IP terminals, 412A through 412C, are provided as part of the H.323 network portion 102. In accordance herewith, the terminals are provided to be "intelligent", that is, they are "service-active" or "service-capable" in that they contain decision-implementation logic for determining how a service is to be effectuated using the H.450.X messaging after obtaining or receiving a result with respect to a service request that is invoked to the service node 408. As a served entity, these terminals can access the service node 408 via the interfacing/converter path 413 or, in some embodiments, via the GW 108, for sending appropriate service requests thereto. In general, in the context of the present patent application, an IP entity from which a service request is invoked to the service node 408 may be referred to as a first entity. Further, this IP entity effectuates relevant decision-implementation logic based on a return result obtained from the service node and transmits an H.450.X message to another appropriate entity which may be referred to as a second entity.

The service architectural scheme of the present invention is preferably provided to be consistent with IN/WIN principles such that it supports all life cycle phases of any subscriber service provided by the network operator. In particular, the service architectural scheme supports independent service logic development and deployment stages of a service life cycle. More importantly, user profile management is also available for service provisioning.

It should be understood upon reference hereto that by combining the IN/WIN-based service nodes in accordance herewith several advantages follow: (i) general approach to services; (ii) support for all phases of service life cycles; (iii) support for universal access; and (iv) easy management of services.

Figure 5:
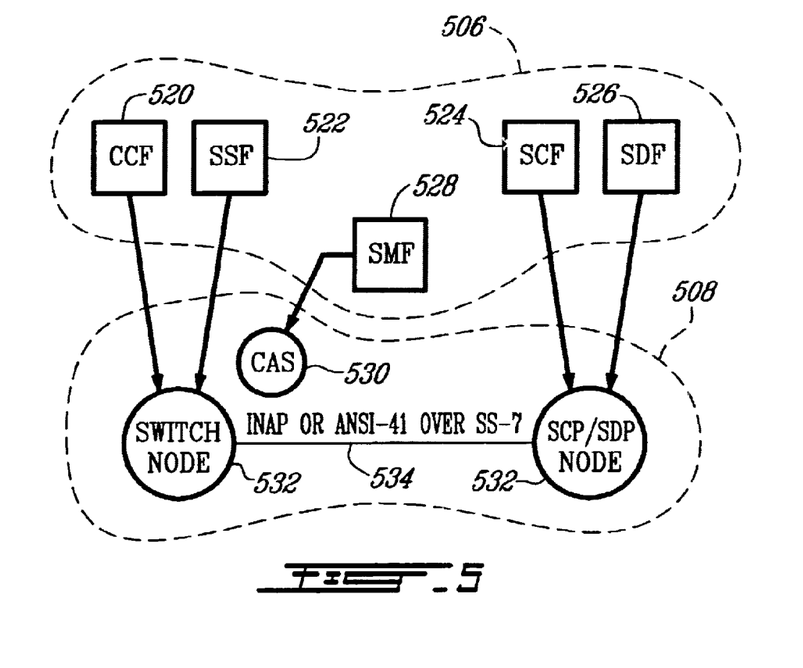
FIG. 5 depicts an architectural scheme for service provisioning in an integrated telecommunications network provided in accordance with the teachings of the present invention.

FIG. 5 depicts details of a distributed functional plane (DFP) layer 506 and physical plane layer 508 which underpin the service architectural scheme of the present invention. In a presently preferred exemplary embodiment of the present invention, the DFP layer 506 comprises the following functional entities (FEs): Call Control Function (CCF) 520, Service Data Function (SDF) 526, Service Switching Function (SSF) 522, Service Control Function (SCF) 524, and Service Management Function (SMF) 528. The FEs are provided for initiating, executing and managing the services. Typically, the FEs and the information flows therebetween are mapped onto actual physical nodes provided as part of the physical plane 508. The CCF entity 520 is provided for handling basic calls and invoking value-added services. The SCF entity 524 contains service logic. Service data is provided in the SDF entity 526. The SSF entity preferably handles communications between the CCF entity 520 and the SCF entity 524. The SMF entity handles management aspects of the services and may include billing functionality.

The SCF entity 524 is preferably mapped onto a separate node such as an SCP node. The SDF entity may also be mapped onto a separate Service Data Point (SDP) node. In an alternative exemplary embodiment, both SCP and SDP may be co-located at a single service node 532. The CCF and SSF entities are preferably provided as part of the switching software and, accordingly, are mapped onto a switch node 532. Preferably, they are included within a gatekeeper that can interface with an SCP. In some alternative embodiments, they may be provided as part of the SCP-H.323 interface. The I/F effectuates a communication path 534 therebetween for transmitting Intelligent Network Application Protocol (INAP), ANSI-41 signaling, or CAP/GSM over SS7. The SMF entity 528 may preferably be provided as a proprietary system, for example, an operator-specific customer administrative system (CAS) node 530.

Figure 6:
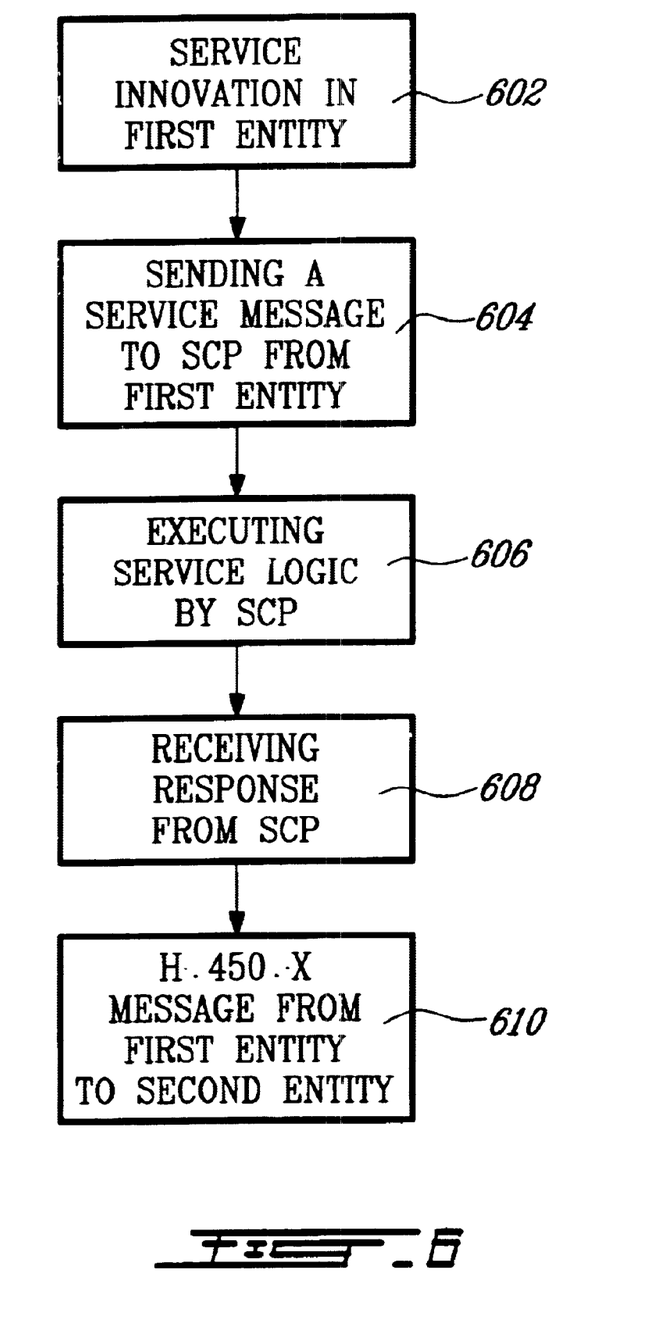
FIG. 6 depicts a flow chart of an exemplary embodiment of a service provisioning method of the present invention.

Referring now to FIG. 6, a flow chart is depicted therein of an exemplary embodiment of a service provisioning method provided in accordance with the teachings of the present invention. When a service is invoked in a first entity (step 602), a service message is sent therefrom to an SCP service node (step 604). Responsive thereto, the service node operates by executing appropriate service logic (decision-making logic) (step 606). A return result or response with respect to what action is to be taken is then received by the first entity from the service node (step 608), which then determines how to effectuate the service action on the basis of the return result. Thereafter, an appropriate H.450.X message is sent by the first entity to a second entity (for example, a re-routing or switching entity such as a GK), using the instruction/indication from the service node as a parameter (step 610). The second entity (re-routing/switching entity) subsequently takes an appropriate service action, for example, establishing a suitable connection or connections for effectuating the invoked service. As may be appreciated by those of ordinary skill upon reference hereto, the service action taken by the second entity is dependent primarily upon the type of service invoked by the first entity and, accordingly, it may constitute a null activity in some instances. Furthermore, the decision implementation aspect of the service provisioning method described hereinabove may involve more than two entities in some exemplary embodiments of the present invention.

Figure 7A:
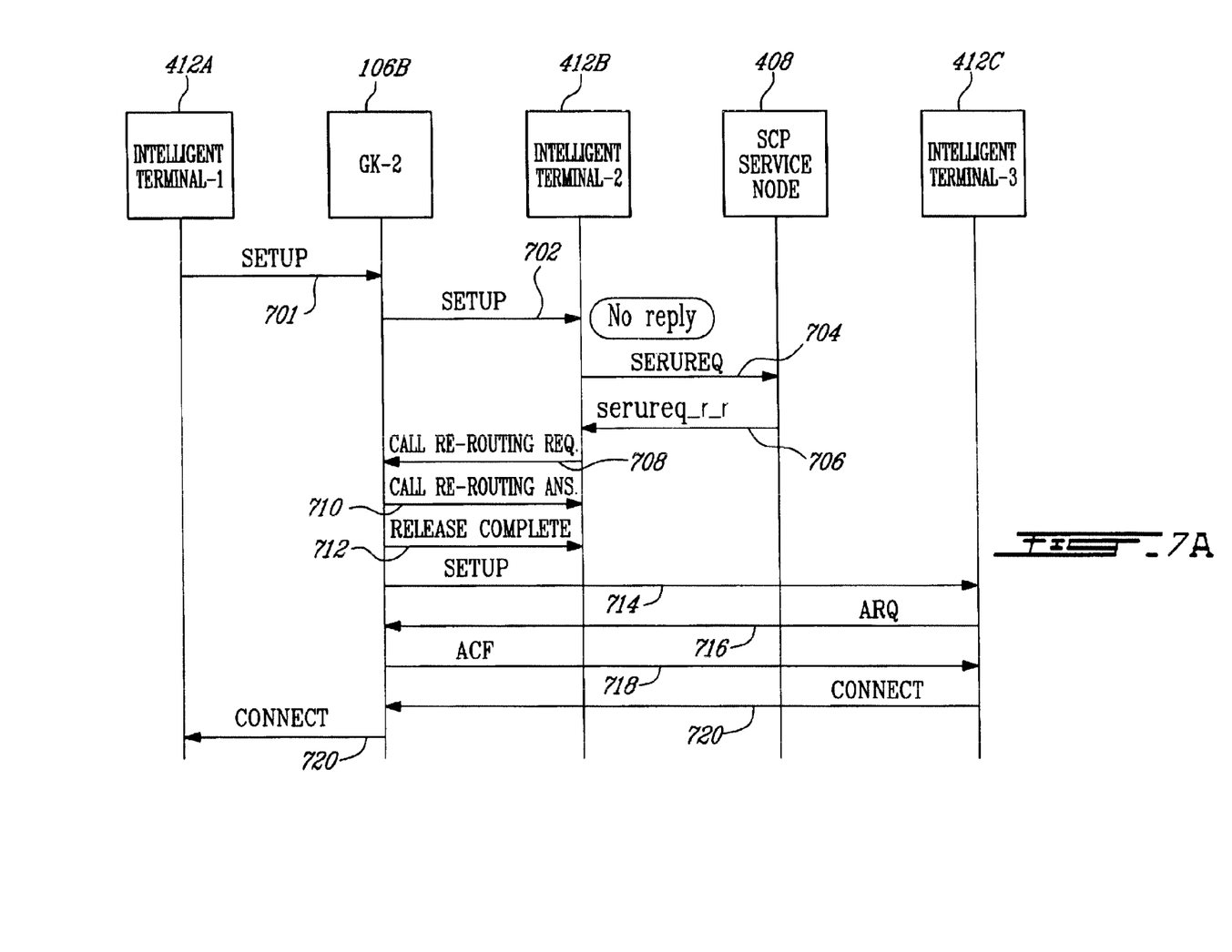
FIGS. 7A and 7B depict two exemplary embodiments of a call diversion service, respectively, in accordance with the teachings of the present invention.
Figure 7B:
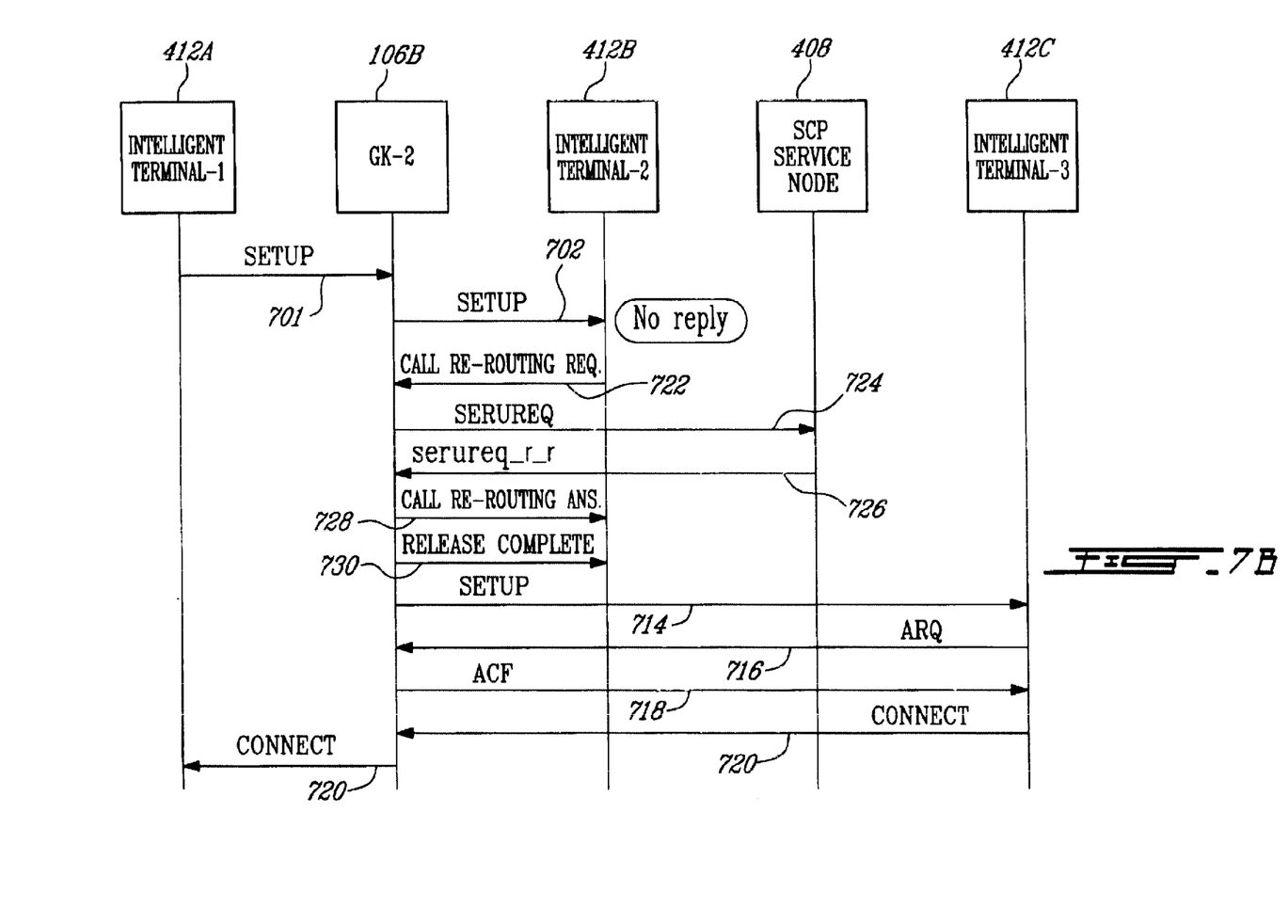

FIGS. 7A and 7B depict message flow diagrams for a call diversion service in two exemplary embodiments, respectively, in accordance with the teachings of the present invention. In particular, the SS-CFNR scenario is exemplified herein. It should be appreciated that in the particular context of the SS-CFNR scenario, the entity where the service is invoked (i.e., first entity) is preferably referred to as the served entity.

In FIG. 7A, terminal-2 412B is treated as the served entity. The gatekeeper node, GK-2 106B, is provided as the re-routing entity. Responsive to a Setup message 701 from terminal-1 412A, GK-2 106B forwards a Setup message 702 to the called party, i.e., terminal-2 412B which detects that a No Reply condition exists. In response, the terminal-2 412B invokes the CFNR service and, accordingly, sends an appropriate service request message 704 (as exemplified by "SERVREQ") to the SCP 408. After executing the appropriate service logic portion, the SCP 408 returns a result 706 (as exemplified by "servreq_r_r") to terminal-2 412B. Subsequently, a Call Re-routing Request 708 is sent from terminal-2 412B to GK-2 106B, with suitable parametric information based on the return result 706. Preferably, the return result 706 comprises an address of the entity to which call is to be re-routed (that is, a diverted-to entity). It may be an IP address or Alias of a terminal, an E.164 number of a mobile station, or some other suitable address information such as a gateway address.

Thereafter, a Call Re-routing Answer 710 is provided to terminal-2 412B as an acknowledgment by GK-2 106B. Subsequently, a plurality of messages (messages 712–720), which are essentially the same as the messages 308–316 described in reference to the conventional CFNR scenario depicted in FIG. 3, are effectuated among GK-2 106B, terminal-2 412B (diverting or served entity) and terminal-3 412C (which is provided to be the diverted-to entity). These messages operate so as to release the connection between GK-2 and terminal-2 and make the re-routing connection between GK-2 and terminal-3.

In FIG. 7B, GK-2 is provided as a re-routing entity as well as a served entity for the purpose of diverting the call between terminal-1 and terminal-2. It should be apparent to those skilled in the art that the control messages depicted in FIG. 7B are essentially similar to those described hereinabove. Basically, GK-2 triggers the service request to the SCP instead of terminal-2 in order to obtain an appropriate result for the diverted-to entity.

Based on the foregoing, it should be appreciated that the present invention advantageously combines the principles of WIN service architecture with H.450.X messaging such that the deficiencies of the conventional VoIP service provisioning schemes are ameliorated. Because the general approach of IN/WIN-standardized service development phases are available, network operators can easily accommodate various services for better service-based market differentiation. Since virtually all phases of service life cycles are supported, operators are able to be intimately associated with service logic development and user profile management in order to suit different market niches. Accordingly, additional services can be easily added or removed as required.

Moreover, by utilizing the teachings of the present invention, the WIN/IN service logic base that is already installed and market-tested may continue to be re-used even as VoIP network architectures come into existence. Those of ordinary skill in the art should realize that there exist tremendous incentives, economic as well as infrastructure-based, for network operators to re-use the expensive legacy SCP/SDP nodes as they migrate towards integrating the cellular infrastructures with IP-based PSNs.

Further, it is believed that the operation and construction of the present invention will be apparent from the foregoing Detailed Description. While the method and system shown and described have been characterized as being preferred, it should be readily understood that various changes and modifications could be made therein without departing from the scope of the present invention as set forth in the following claims. For example, although the teachings of the present invention have been exemplified with a particular SS within the context of the H.450 Recommendation, it should be understood that other SSs under the existing or future H.450.X Recommendations may also be provisioned in accordance with the teachings of the present invention. That is, in addition to the SS-DIV process exemplified herein, the teachings hereof may be also applied in the context of the following services: toll free and credit card calling, cellular hunt, selective call restriction, click to fax, double phone/ free phone, split charging, and multimedia applications such as tele-medicine, tele-education, video-on-demand, et cetera.

Furthermore, while pluralities of H.323-based terminals have been described in the exemplary embodiments of the present invention, any combination of non-H.323 entities such as mobile stations operable with a variety of air interface standards, taken in conjunction with VAS-enabled Personal Digital Assistants, "smart" phones, personal computers, laptop computers, palmtop computers, Information Appliances, wireless transceiver wrist watches, pagers, et cetera, may be provided for the purposes of the present invention. In addition, the innovative teachings contained herein may also be practiced in a VoIP network coupled to a PSTN, wherein the served entities can trigger service requests to a service node. Accordingly, it should be realized that these and other numerous variations, substitutions, additions, re-arrangements and modifications are contemplated to be within the ambit of the present invention whose scope is solely limited by the claims set forth below.

What is claimed is:

1. A service provisioning method for use in an integrated telecommunications network having a packet-switched network (PSN) portion and a circuit-switched network (CSN) portion, wherein a service node including at least one of a Service Control Point (SCP) and a Service Data Point (SDP) is disposed in the CSN portion, the method comprising the steps of:
   providing an interface module disposed between the service node and the PSN portion;
   invoking a service in a first entity disposed in the PSN portion;
   responsive to the invoking step, sending a service message from the first entity to the service node via the interface module;
   executing a service logic portion associated with the service by the service node to determine an action to be taken with respect to the invoked service;
   sending a return result from the service node to the first entity, the return result being associated with the action corresponding to the invoked service;
   determining, in the first entity, how the action corresponding to the invoked service is to be effectuated, and thereafter transmitting an indication of the return result from the first entity to a second entity, the indication being compatible with a message protocol used by the PSN portion; and
   taking an appropriate service action by the second entity based on the indication received from the first entity.

2. The service provisioning method as set forth in claim 1, wherein the invoked service comprises a call transfer service and the first entity comprises a PSN terminal.

3. The service provisioning method as set forth in claim 1, wherein the invoked service comprises a call diversion service and the first entity comprises a PSN terminal.

4. The service provisioning method as set forth in claim 1, wherein the indication of the return result comprises an H.450.X message.

5. A call diversion method for use in an integrated telecommunications network having a packet-switched network (PSN) portion and a circuit-switched network (CSN) portion, wherein a service node including at least one of a Service Control Point (SCP) and a Service Data Point (SDP) is coupled via an interface to the PSN portion, the PSN portion including a call-originating entity, a served entity and a switching entity, the call diversion method comprising the steps of:
   sending a first setup message from the call-originating entity to the switching entity pursuant to placing a call to the served entity;
   thereafter, sending a second setup message from the switching entity to the served entity and establishing a first connection therebetween;
   responsive to the second setup message, sending a service message from the served entity to the service node via the interface;
   based on the service message, executing by the service node a service logic portion associated with the service;
   sending a return result from the service node to the served entity, the return result comprising an address of a diverted-to entity to which the call from the call-originating entity is to be diverted;
   transmitting a call re-routing request from the served entity to the switching entity, the call re-routing request including an indication of the return result from the service node;
   responsive to the call re-routing request, sending a call re-routing request answer from the switching entity to the served entity;
   thereafter, releasing the first connection between the switching entity and the served entity;
   admitting the diverted-to entity by the switching entity; and
   establishing a second connection between the call-originating entity and the diverted-to entity.

6. The call diversion method as set forth in claim 5, wherein the diverted-to entity comprises a mobile station disposed in the CSN portion.

7. The call diversion method as set forth in claim 5, wherein the diverted-to entity comprises a fixed telephone disposed in the CSN portion.

8. The call diversion method as set forth in claim 5, wherein the diverted-to entity comprises an H.323-based terminal disposed in the PSN portion.

9. The call diversion method as set forth in claim 5, wherein the diverted-to entity is selected from the group consisting of a Personal Digital Assistant, a smart phone, a laptop computer, a personal computer, a palmtop computer, a pager, and an Information Appliance.

10. A call diversion method for use in an integrated telecommunications network having a packet-switched network (PSN) portion and a circuit-switched network (CSN) portion, wherein a service node including at least one of a Service Control Point (SCP) and a Service Data Point (SDP) is coupled via an interface to the PSN portion, the PSN portion including a call-originating entity, a diverting entity and a switching entity, the call diversion method comprising the steps of:
   sending a first setup message from the call-originating entity to the switching entity pursuant to placing a call to the diverting entity;
   thereafter, sending a second setup message from the switching entity to the diverting entity and establishing a first connection therebetween;
   responsive to the second setup message, transmitting a call re-routing request from the diverting entity to the switching entity;
   based on the call re-routing request, sending a service message from the switching entity to the service node via the interface;

executing by the service node a service logic portion associated with the service;

sending a return result from the service node to the switching entity, the return result comprising an address of a diverted-to entity to which the call from the call-originating entity is to be diverted;

sending a call re-routing request answer from the switching entity to the diverting entity;

thereafter, releasing the first connection between the switching entity and the diverting entity;

admitting the diverted-to entity by the switching entity; and establishing a second connection between the call-originating entity and the diverted-to entity.

11. The call diversion method as set forth in claim 10, wherein the diverted-to entity comprises a mobile station disposed in the CSN portion.

12. The call diversion method as set forth in claim 10, wherein the diverted-to entity comprises a fixed telephone disposed in the CSN portion.

13. The call diversion method as set forth in claim 10, wherein the diverted-to entity comprises an H.323-based terminal disposed in the PSN portion.

14. The call diversion method as set forth in claim 10, wherein the diverted-to entity is selected from the group consisting of a Personal Digital Assistant, a smart phone, a laptop computer, a personal computer, a palmtop computer, a pager, and an Information Appliance.

\* \* \* \* \*